(12) United States Patent
Sipola

(10) Patent No.: US 6,594,791 B2
(45) Date of Patent: Jul. 15, 2003

(54) SIGNALLING METHOD IN AN INCREMENTAL REDUNDANCY COMMUNICATION SYSTEM WHEREBY DATA BLOCKS CAN BE COMBINED

(75) Inventor: Jussi Sipola, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/912,934

(22) Filed: Jul. 25, 2001

(65) Prior Publication Data

US 2002/0129312 A1 Sep. 12, 2002

Related U.S. Application Data

(63) Continuation of application No. PCT/EP99/00588, filed on Jan. 29, 1999.

(51) Int. Cl.[7] ................................................ H04L 1/18
(52) U.S. Cl. ........................................ 714/748; 714/750
(58) Field of Search .............................. 714/748, 811, 714/750; 370/409, 348, 465; 340/825.5; 709/223

(56) References Cited

U.S. PATENT DOCUMENTS

| | | | | |
|---|---|---|---|---|
| 4,422,171 A | * | 12/1983 | Wortley et al. | 714/748 |
| 4,491,945 A | * | 1/1985 | Turner | 370/409 |
| 4,654,654 A | * | 3/1987 | Butler et al. | 340/825.5 |
| 4,745,599 A | * | 5/1988 | Raychaudhuri | 370/348 |
| 5,537,416 A | | 7/1996 | MacDonald et al. | |
| 5,805,816 A | * | 9/1998 | Picazo, Jr. et al. | 709/223 |
| 6,208,663 B1 | * | 3/2001 | Schramm et al. | 370/465 |
| 6,418,549 B1 | * | 7/2002 | Ramchandran et al. | 714/811 |

FOREIGN PATENT DOCUMENTS

EP 0866579 A1 9/1998

OTHER PUBLICATIONS

International Search Report for PCT/EP99/00588.

* cited by examiner

Primary Examiner—David Ton
(74) Attorney, Agent, or Firm—Squire, Sanders & Dempsey L.L.P.

(57) ABSTRACT

A method of signaling which data blocks can be combined together in an incremental redundancy communication system includes a transmitter device and a receiver device. The method includes transmitting the blocks from a transmitter device to a receiver device. Each transmitted data block includes an information indicating whether a respective data block is transmitted for a first time or is a retransmitted block. At the receiver device, a check is made to see whether the transmission of a respective data block has failed. If the transmission of said respective block has failed, retransmission is made. In response to receiving the retransmission request at the transmitter device side, the information is set to a value indicating that the respective data block is a retransmitted block. A header is added to the data block to be retransmitted, the header representing a reference to a physical location of an earlier transmission of said block in a sequence of transmitted blocks.

22 Claims, 6 Drawing Sheets

FIG. 2
(PRIOR ART)

| TIME | TRANSMITTED BLOCKS | |
|---|---|---|
| 0 | BN = 546 | DATA X — B0 |
| 1 | BN = 547 | DATA Y — B1 |
| 2 | BN = 546 | DATA X |
| 3 | BN = 548 | DATA Z — Bn |

FIG. 4

| TIME | TRANSMITTED BLOCKS | | |
|---|---|---|---|
| 0 | T = 0 | | DATA X — B0 |
| 1 | T = 0 | | DATA Y — B1 |
| 2 | T = 1 | REF=0 | DATA X |
| 3 | T = 0 | | DATA Z — Bn |

MAPPING TRANSMISSION TIME OF BLOCK TO NUMBER

| FREQUENCY | | TRANSMITTED BLOCKS | | | |
|---|---|---|---|---|---|
| 0 | F1 | T = 0 | DATA X | | — B0 |
| 1 | F2 | T = 0 | DATA Y | | — B1 |
| 2 | F3 | T = 1 | REF=0 | DATA X | . |
| 3 | F4 | T = 0 | DATA Z | | — Bn |

MAPPING TRANSMISSION FREQUENCY OF BLOCK TO NUMBER

II.)

| CODE | | TRANSMITTED BLOCKS | | | |
|---|---|---|---|---|---|
| 0 | C1 | T = 0 | DATA X | | — B0 |
| 1 | C2 | T = 0 | DATA Y | | — B1 |
| 2 | C3 | T = 1 | REF=0 | DATA X | . |
| 3 | C4 | T = 0 | DATA Z | | — Bn |

MAPPING TRANSMISSION CODE OF BLOCK TO NUMBER

FIG. 5B

III.)

| | FREQUENCY | CODE | TIME | |
|---|---|---|---|---|
| 0 | F1 | C1 | 0 | ⎤ — HYPER-BLOCK |
| 1 | F1 | C1 | 1 | |
| 2 | F1 | C1 | 2 | |
| 3 | F1 | C1 | 3 | |
| 4 | F1 | C2 | 0 | ⎤ — BLOCK |
| 5 | F1 | C2 | 1 | |
| 6 | F1 | C2 | 2 | — SUB-BLOCKS |
| 7 | F1 | C2 | 3 | ⎦ |
| 8 | F2 | C1 | 0 | |
| 9 | F2 | C1 | 1 | |
| 10 | F2 | C1 | 2 | |
| 11 | F2 | C1 | 3 | |
| 12 | F2 | C2 | 0 | |
| 13 | F2 | C2 | 1 | |
| 14 | F2 | C2 | 2 | |
| 15 | F2 | C2 | 3 | |

MAPPING TRANSMISSION FREQUENCY, CODE AND TIME OF BLOCK TO NUMBER (LEFT) OR NESTED BLOCK ARRANGEMENT (RIGHT)

FIG. 5C

| TIME | TRANSMITTED BLOCKS | |
|---|---|---|
| 0 | T = 0 \| DATA X | B0 |
| 1 | T = 0 \| DATA Y | B1 |
| 2 | T = 1 \| REF=0 \| DATA X \| REF=1 \| DATA Y | |
| 3 | T = 0 \| DATA Z | Bn |

MAPPING TRANSMISSION TIME OF BLOCK TO NUMBER,
DIFFERENT NUMBER OF DATA UNITS PER BLOCK,
DEPENDENT ON VALUE OF FLAG T

SIGNALLING METHOD IN AN INCREMENTAL REDUNDANCY COMMUNICATION SYSTEM WHEREBY DATA BLOCKS CAN BE COMBINED

The present application is a continuation of application No. PCT/EP99/00588 filed on Jan. 29, 1999.

FIELD OF THE INVENTION

The present invention relates to a method of signaling which data blocks can be combined together in a communication system consisting of a transmitter device and a receiver device. In particular, the present invention relates to such a method applied to combinable blocks transmitted in an incremental redundancy communication system.

BACKGROUND OF THE INVENTION

The expression of combining as used in connection with the present application is intended to be understood as code combining. This means the combining of data (e.g. data bits) received via a channel during an original transmission together with the data (data bits) received via the channel during a retransmission of the data. After such a combining of data has been effected, channel decoding is performed based on the information from both transmissions and only then the received data block is checked for errors.

Furthermore, the expression incremental redundancy means a method of adapting a code rate, i.e. an amount of coding adopted in a communication system having a channel with varying transmission conditions.

Referring to a general example, a block of data is assumed to be coded with a code rate of ½. Then, one half of this coded data is sent during an initial (original) transmission. At a receiver side, received data are perceived as having a code rate of ¼. At a retransmission (if necessary upon failure in the original transmission), the other half of the coded data is transmitted, combined to the first half of the data block, and then a code rate of ½ is recognized at the receiver side. Such a combining then increases the amount of total coding in incremental redundancy systems.

FIG. 1 of the drawings illustrates a conventional transmission system denoted with numeral 1. Generally, a communication system 1 consists of a transmitter device 1A and a corresponding receiver device 1B. Transmission of data between these devices takes place via a transmission channel 1C established there between.

A communication method adopted by such a communication system is explained below with reference to FIG. 1, in which the respective steps are indicated by numbers (1) to (4). According to such a conventional communication method data are transmitted in units of blocks (also referred to as packetized data) via the channel with some channel coding. Namely, as indicated in step (1), a (first) data block #1 containing data X is sent from the transmitter device 1A to the receiver device 1B. If the receiver device 1B is not able to receive the transmitted block #1, a corresponding notification indicating this transmission error or failure, respectively, is returned to the transmitter device 1A. This notification is also called negative acknowledgment and represents a retransmission request upon a reception failure (step (2)). In response thereto, the transmitter device 1A in step (3) then transmits another block (data block #2) containing the same data X as contained in the (previous) data block #1. For this transmission, possibly an other coding can be used. The receiver device 1B in turn combines the data blocks received so far (step (4)), i.e. data block #1 is combined with data block #2, and tries to decode the retransmitted block again. This combining, as already mentioned above in connection with the general example, effectively increases the amount of total coding and thus decreases the probability of further errors.

However, since a subsequent data block containing the next data is only transmitted after a preceding block has been successfully transmitted or retransmitted, the whole communication procedure is somewhat delayed and the data rate that can be transmitted is reduced.

In order to reduce the delay and increase transmission rate, another prior art method and corresponding system has been proposed, according to which a plurality of blocks are transmitted in sequence without waiting for the respective acknowledgment. However, in such a situation, a retransmitted data block does not immediately follow the original one.

Consequently, the receiver device 1B of the communication system does not automatically know which data blocks can be combined with each other.

FIG. 2 schematically exemplifies a prior art method which has been developed to cope with this problem.

According to this known method, each data block B0, B1, . . . , Bn in the sequence of transmitted data blocks is assigned a sequence number or block number BN. In case there occurs an error in transmission or a reception failure in connection with an initial (first) or original transmission of a subject data block and a retransmission is requested, the retransmission is assigned the same number as the original transmission. The block numbers have to be coded more robustly, i.e. with higher redundancy, so that the probability that the receiver is unable to decode or recognize the block number is reduced to a minimum.

Thus, provided that the receiver device has received the block numbers, the blocks that have the same number can be combined with each other.

Specifically, with reference to the example of FIG. 2, a sequence of four data blocks containing data X, Y, and/or Z is transmitted at time instants 0, 1, 2, and 3. The first block B0 to which a block number BN of 546 has been assigned for the specific example, is assumed to have not been received correctly, so that its transmission has to be repeated.

The retransmission of said data block identified by BN=546 occurs at a time instant "2". At this time, the block is retransmitted as indicated by the identical block number of BN=546 at time instant "2" and the data block contains the same data X as in the initial transmission at time instant "0".

However, there is a disadvantage of this known method in that the amount of data that can be transmitted is reduced due to the additional overhead represented by the adopted block numbering which has to be transmitted in form of the block numbers BN together with each data block B0, . . . , Bn.

Moreover, even in case the transmission quality of the channel is as high that no errors occur, the block numbering still reduces the amount of user data that can be transmitted in the communication system.

Document EP-A-0 866 579 discloses the features of the preamble of claims 1 and 12, respectively. More precisely, also this document teaches that no serial or block numbers are transmitted to the receiver.

Furthermore, document U.S. Pat. No. 5,537,416 teaches to avoid to transmit location information or serial/block with each block.

SUMMARY OF THE INVENTION

Hence, it is an object of the present invention to provide a method of signaling which data blocks can be combined together in an incremental redundancy communication system consisting of a transmitter device and a receiver device, which is free from the above mentioned drawbacks and enables an increased data throughput. Moreover, it is an object of the present invention to provide a corresponding communication system.

According to the present invention, this object is achieved by a method of signaling which data blocks can be combined together in an incremental redundancy communication system consisting of a transmitter device and a receiver device, the method comprising the steps of transmitting said blocks from a transmitter device to a receiver device, with each transmitted data block including an information indicating whether a respective data block is transmitted for a first time or is a retransmitted block; checking, at said receiver device, whether the transmission of a respective data block has failed; requesting a retransmission of said data block from the transmitter device if said transmission of said respective block has failed, and in response to receiving said retransmission request at the transmitter device side, setting said information to a value indicating that said respective data block is a retransmitted block, and adding at least one header to said data block to be retransmitted, said header representing a reference to a physical location of an earlier transmission of said block in a sequence of transmitted blocks.

Also, this object is achieved by a communication system consisting of a transmitter device and a receiver device, each adapted to carry out the above method.

Favorable refinements of the present invention are as defined in the dependent claims.

Thus, according to the present invention it is advantageously possible to eliminate the need for each original block to contain block numbering information. Consequently, the previously present overhead due to block numbering can be significantly reduced, thereby increasing the user data throughput in the communication system. The only overhead needed in the original transmission of respective data blocks is a flag that can be represented by a single bit only. Thus, in case where a retransmission is not required, the overhead is reduced to a negligible and minimum overhead in the proposed incremental redundancy system.

The proposed method may further advantageously be applied to nearly any communication system in which data are transmitted in units of blocks or as so called packets.

BRIEF DESCRIPTION OF THE DRAWINGS

The present invention will be more readily understood when referring to the enclosed drawings, in which:

FIG. 2 illustrates in principle a data format used for data blocks transmitted according to a further communication method known in the art;

FIG. 4 illustrates in principle a data format used for data blocks transmitted according to an embodiment of the present invention;

FIG. 5A illustrates in principle a data format used for data blocks transmitted according to two further embodiments of the present invention;

FIG. 5B illustrates in principle a data format used for data blocks transmitted according to a still further variation of the present invention obtained by a combination of the presented embodiments; and FIG. 5C illustrates in principle a data format used for data blocks transmitted according to another modification representing an additional embodiment of the present invention.

DETAILED DESCRIPTION OF THE EMBODIMENTS OF THE INVENTION

Figure 1:
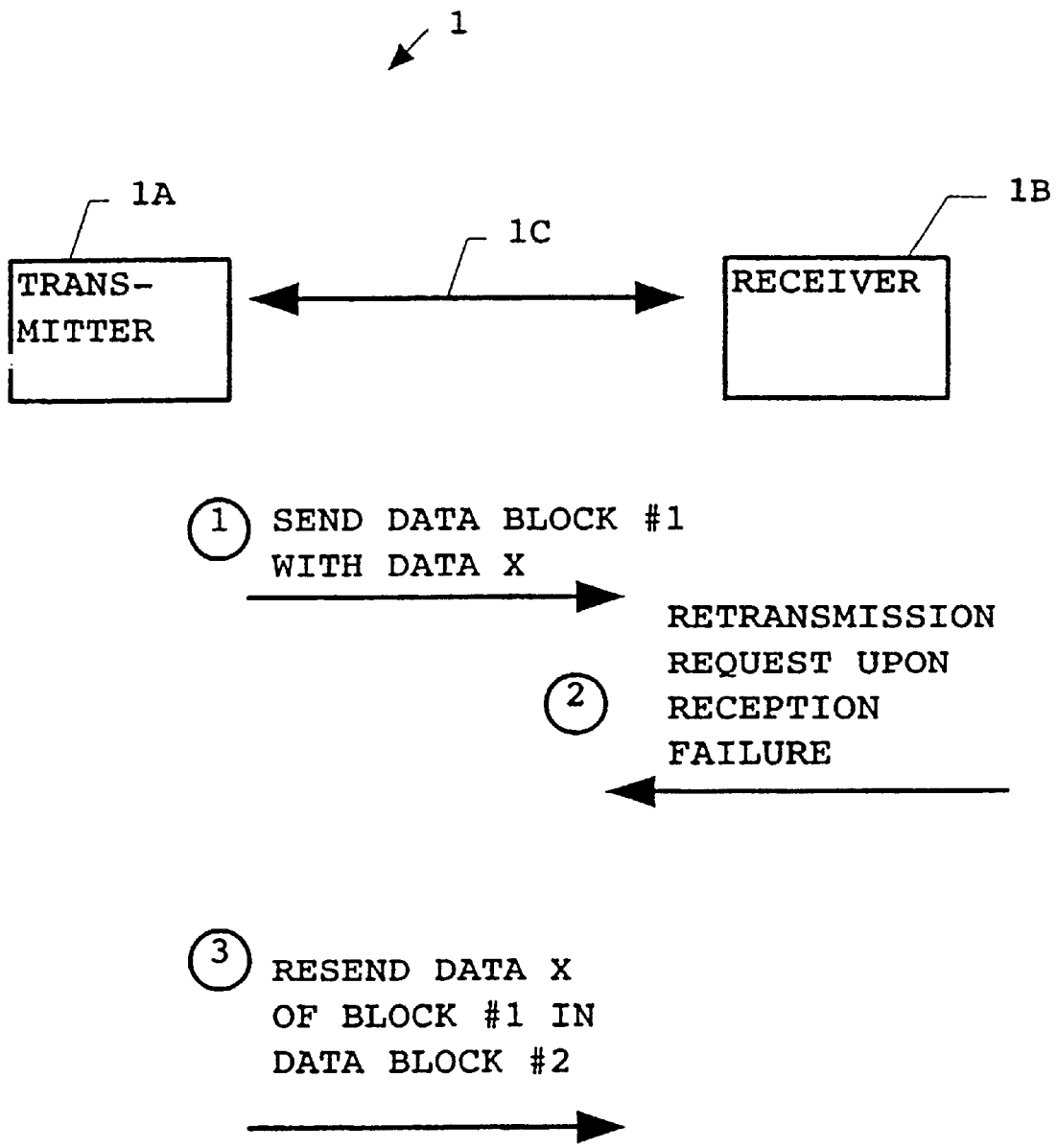
FIG. 1 schematically shows a block diagram of and communication steps performed by a conventional communication system.

According to the present invention, block numbers are advantageously no longer needed to be transmitted with extra redundancy. Stated in other words, block numbers are not needed for the code combining function, while they may nevertheless be retained, if they are needed for other functions implemented on higher layers.

A transmitter device and a receiver device of a communication system both agree on a numbering scheme, which is based on a physical location of blocks in a sequence of transmitted data blocks. The agreement on the numbering scheme is for example reached in an initial "handshaking" procedure performed between the receiver and transmitter devices. Alternatively, the agreement can in a preferred manner also be made during the design and specification of the communication system, which thus removes the signaling which is otherwise required in connection with the handshaking.

Such a numbering scheme may for example be obtained by mapping the time of transmission of each data block of the transmitted sequence of data blocks to a number of the numbering scheme. In this case, the transmission time of the data block represents the physical location of said retransmitted block in the sequence of transmitted blocks.

Alternatively, instead of time, also the transmission frequency used for transmission can be mapped to a corresponding numbering scheme, so that the used frequency represents the physical location of said retransmitted block in the sequence of transmitted blocks.

As a still further alternative, also the transmission code used for transmission can be mapped to a corresponding numbering scheme, so that the used code represents the physical location of said retransmitted block in the sequence of transmitted blocks.

Also, any combination of the above introduced numbering schemes can be adopted, so that the numbering reflects a combination of plural physical locations of a data block, namely for example a location in the frequency domain, the code domain and the time domain.

Still further, it is conceivable to adopt a block nested scheme or hierarchical structure. For example, a number i of transmitted blocks (also referred to as sub-blocks or elementary blocks) is grouped to form a higher order block (referred to as "block"), while a number k of such "blocks" (which itself consist of the sub-blocks) may again be grouped to form for example a block arrangement called "hyper-block". Such grouping of elementary blocks can be effected for a respective single one of the above domains represented by a physical parameter representing in turn the physical location of a respective block, or for a combination of plural of the domains.

Moreover, as regards the above mentioned alternatives, there exists also the possibility of using differential references relative to the time/frequency/code of the retransmission in the retransmission. Stated in other words, there is no reference to the absolute physical location of the original transmission included in the retransmission, but a differential (and/or relative) reference pointing to the original transmission in that the difference to the current physical location of the retransmission is indicated. Such a reference is also suitable since in practice there may be an infinite number of time instants and not only a limited number of time instants as illustrated in the examples given below.

With a numbering scheme being based on the physical location of a block, in each block there is only one bit T required which indicates whether the respective block is a new or original one (transmitted for the first time), T=0, or whether the respective block is a retransmitted one, T=1, that can be combined with (contains the same data as) a previously transmitted block which has not been received or received with error.

Then, only in case of T=1 there is an additional header present in the block. The information contained in this header represents the physical number (location) of the original (or, more generally, an earlier) transmission of the block. Based on this number, the receiver can find the original (earlier) transmission of the block and combine the two blocks with each other.

Particularly, the presence of the (set) bit T serves for the purpose of indicating the presence of the (additional) header to the receiver device.

The header as well as the bit T are coded for transmission via the transmission channel, so that they can be received under nearly all channel conditions without error.

In case of a block nested numbering scheme, the bit T may then be common to all sub-blocks in one block (and/or to all blocks in a hyper-block). In such cases, it has to be noted that the header then contains multiple references such as, for example, an order of reference as follows: hyper_block_reference, block_reference, sub_block_reference, each represented by a corresponding number. More precisely, let's assume a case in which 8 sub-blocks form one block, four blocks form one hyper-block, and the hyper-blocks are sequentially transmitted. Then, a header may contain the following information (5, 3, 7), which means that the original transmission occurred in the seventh sub-block of the third block within the fifth hyper-block.

Also, the number of data units or packets (within a e.g. sub-block or block represented by a physical location) is not necessarily the same for both values of T. This means that a (sub-)block identified by a bit T=1 may contain several data units (packets) which are retransmitted and also a corresponding number of headers.

In connection with the bit T, this bit may be coded as a part of other signaling information in the system. According to a further modification, the T bit may not be required, if the receiver device performs the decoding separately for both values of T. For example, if the bit T is not transmitted but dropped, the receiver device may first test if a header is present by using a cyclic redundancy check CRC of the header. If the CRC matches, the receiver device assumes that T=1 and the header is thus present, while otherwise a value of T=0 with the header being not present is assumed.

Also, it should be noted that when the additional header including the reference indication is added, some data bits are stolen for this purpose to thereby maintain the physical length of each (sub-)block constant so that the occurrence of synchronization problems is prevented. The stealing of some bits may be assumed to be uncritical, since the retransmitted bits are combined with the bits of the original transmission of the data block.

Still further, particularly in connection with the above mentioned code/frequency physical references, it has to be mentioned that it is, of course, never possible to send the initial and retransmitted data block transmission at the same time. Therefore, there always has to be some kind of time reference, while this can be agreed on and defined in advance to be for example a fixed number of blocks relative to the retransmission.

The present invention will subsequently be described in detail with reference to the drawings.

Figure 3:
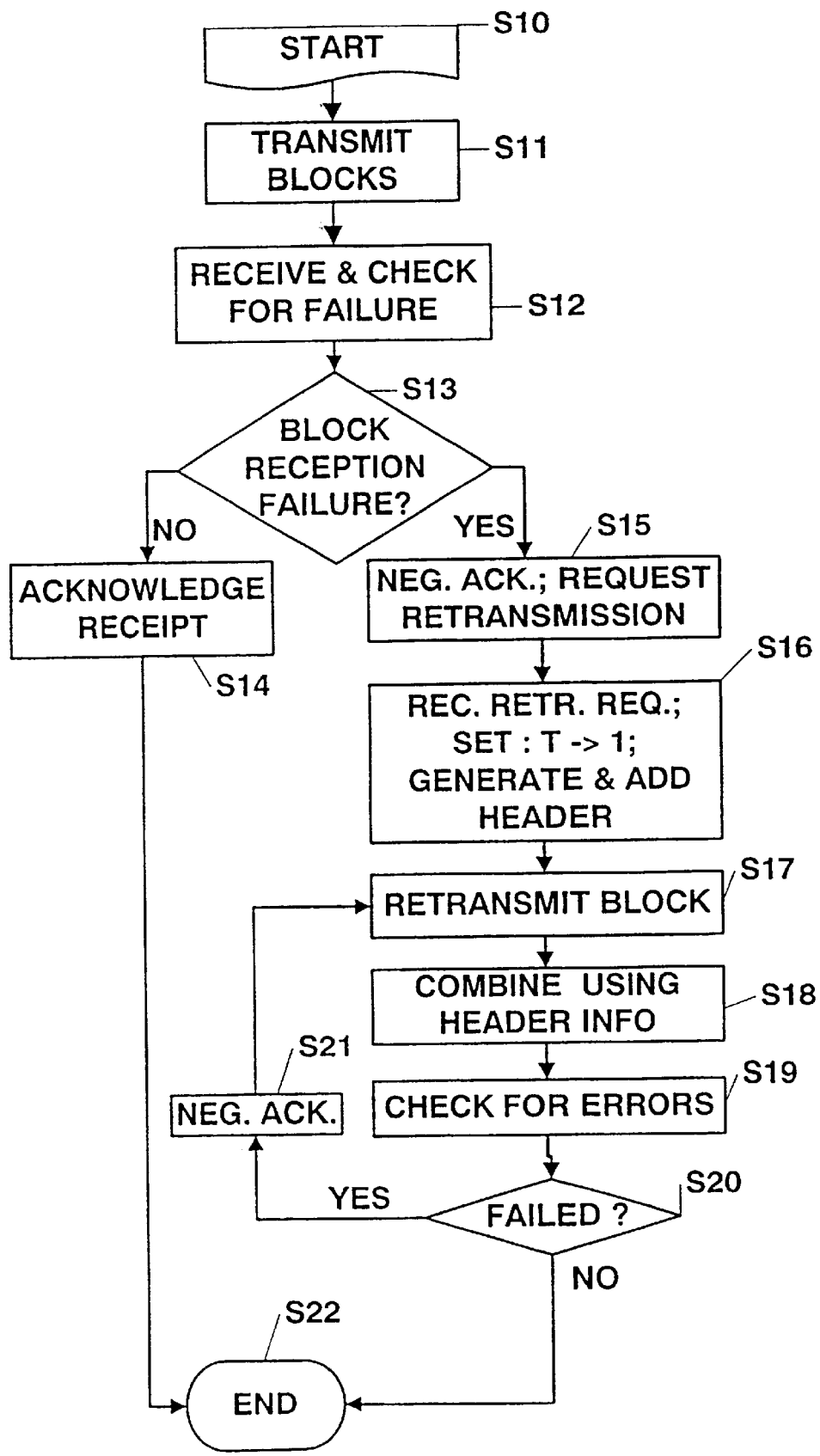
FIG. 3 represents a flowchart of the method according to the present invention.

FIG. 3 represents a flowchart of the method according to the present invention after (for example the above mentioned handshake procedure has been completed and) the receiver and transmitter have agreed on one of the above mentioned numbering schemes which is based on the physical location of data blocks or packets, respectively.

In step S10, the procedure starts. In a following step S11, the transmitter device transmits the sequence of data blocks. The receiver device, in turn, receives the transmitted data blocks and checks for transmission failure, as indicated in a subsequent step S12.

As a result of executing a step S13, it is determined whether a failure in reception of a particular data block has occurred. If no failure has been detected by the receiver device (NO in step S13), the method flow branches to the left and a receipt of acknowledgment is returned from the receiver device to the transmitter device, step S14. (However, in a modification, the acknowledgment need not necessarily be forwarded, since already the absence of a retransmission request could be regarded as an acknowledgment. Alternatively, also the absence of an acknowledgment could be regarded as a retransmission request.) After step S14, the flow advances to step S22, at which step, for a respective block, the procedure is thereafter terminated. Of course, the method will be repeatedly performed and check each of the blocks transmitted in the sequence of blocks.

If, however, in step S13 a reception failure for a current data block of interest has been detected (YES in step S13), the flow branches to the right and steps S15 to S22 are executed.

Namely, in step S15, the receiver device returns a negative acknowledgment to the transmitter device, thereby requesting retransmission of the data block the original (first) transmission of which has failed.

In a following step S16, at the transmitter device side, the retransmission request is received. In response thereto, a flag T associated to each data block is set to a value of "1", and a header is generated and added to the respective data block, of which the associated flag T has been set to "1". Then, step S17, the respective data block identified by the flag T=1 and the header is retransmitted.

Subsequently, in step S18, the receiver reads the information contained in the header, and subsequently combines the retransmitted block, i.e. the data contained in the data block, with the originally transmitted block containing the same data. The combining is effected using the information contained in the header and representing a reference to a physical location of said original (earlier) block in a sequence of transmitted blocks.

Thereafter, in a following step S19, a check for errors is conducted at the receiving side. Namely, it is checked whether the combined original and retransmitted blocks are successfully received. Stated in other words, it is checked whether the combination of the original block and the retransmitted one can be decoded without errors. If also after the combination of these blocks, there are errors (YES in step S20), in a subsequent step S21, a negative acknowledgment is forwarded to the transmitter device and another retransmission is requested. Thereafter, the flow returns to step S17 and the block is again retransmitted.

If, however, the combined blocks did not contain errors (NO in step S20), the flow advances to step S22.

Then, in step S22, the flow ends insofar as the subject block and the data contained therein is concerned.

FIG. 4 illustrates in principle a data format used for data blocks transmitted according to an embodiment of the present invention. The example represented in FIG. 4 is based on similar assumptions as the one depicted in FIG. 2.

Namely, blocks B0, B1, . . . , Bn with data X,Y, and Z, respectively, are sequentially transmitted. Also, the transmission of block B0 is assumed to have failed.

In particular, as shown in FIG. 4, the block number header overhead has been removed and replaced by a single bit T for each block. The bit T=0 indicates that the block and the data therein are transmitted for the first time, while after setting the bit T to the value T=1 (upon receipt of a negative acknowledgment), this indicates that the block concerned is a retransmitted one. Further, only in case the bit T assumes a value of T=1, an additional header is generated and added to the block. The header contains a reference REF to the physical location of the originally transmitted block. In the shown example, four blocks are transmitted at time instants 0, 1, 2, and 3. The first block B0 is not received correctly and has to be resent. The repeated transmission of this block occurs at time instant 2. At this time, the bit T which originally had a value of T=0 then has a value of T=1 in the retransmission. Moreover, the additional header contains a reference information REF which represents the value of time when the block was originally transmitted (REF=0).

FIG. 5 shows variations of this principle of indicating a reference information REF to a physical location of the originally transmitted block.

FIG. 5A, diagram I.) shows a further example case according to which not the transmission time is mapped to a numbering scheme, but according to which the transmission frequency is mapped to a numbering scheme. Assuming a case in which the transmitter and receiver have agreed on a numbering scheme (e.g. in the handshaking operation), that a sequence of blocks to be transmitted is transmitted such that for each new block another transmission frequency is used (a kind of "frequency hopping"). Specifically, blocks are transmitted such that a sequence of frequencies F1, F2, F3, F4 is used which is mapped to a numbering of 0, 1, 2, 3. Then, if the block transmitted on frequency F1 is not received correctly, it is retransmitted on frequency F3, with the bit T being set to "1" and the header contains a reference REF=0 indicating that this is a retransmission of the block originally transmitted with frequency F1 (frequency sequence number "0").

Likewise, FIG. 5A, diagram II.) illustrates a similar case, while however in this case a transmission code of a respective block is mapped to a numbering scheme. That is, the transmitter and receiver have agreed on a numbering scheme that a sequence of blocks to be transmitted is transmitted such that for each new block another transmission code is used (a kind of "code hopping"). The explanations given herein above in connection with diagram I.) can be applied to diagram II.) with the exception that now the code (instead of the frequency) represents a reference to a physical location of the originally transmitted block.

FIG. 5B (diagram III.) shows a further modification of an adopted numbering scheme, in which the references to the physical location of an originally transmitted block in terms of frequency domain, code domain and time domain have been combined. It is to be noted that this only represents one example and various other modifications are conceivable.

In detail, diagram III.) represents a case of a numbering scheme (0, . . . , 15) in which transmitter device and receiver device have agreed upon using two frequencies (F1,F2), two codes (C1,C2) and four time instants (0, . . . , 3). More specifically, while frequency F1 is selected (numbering 0, . . . , 7), a first code C1 is selected, and during the selection F1 & C1, blocks are transmitted during four consecutive time instants (0, . . . , 3), i.e. numbers 0 to 3 in the numbering scheme. Then, while the frequency remains the same (F1), the code changes to code C2, and during the selection F1 & C2, blocks are transmitted during four consecutive time instants (0, . . . , 3), i.e. numbers 4 to 7 in the numbering scheme. Subsequently, the frequency is changed from F1 to F2, and the same procedure is repeated which corresponds to numbers 8 to 15 in the numbering scheme (outermost left column in FIG. 5B).

In this case, a reference to a physical location of an originally transmitted block is indicated in a retransmitted block header by an information REF containing a value in the range of 0 to 15.

It is also conceivable that, alternatively, the same physical sequence is defined as a nested sub-block (time domain), block (code domain), hyper-block (frequency domain) arrangement (cf. indication at the right side of FIG. 5B). Then, a reference to a physical location of an originally transmitted block is indicated in a retransmitted block header by an information REF which could assume the following format: REF=(h,b,s), wherein h denotes a hyper-block numbering (0 or 1 in the example of FIG. 5B), b denotes a block numbering (0 or 1 in the example of FIG. 5B), and s denotes a sub-block numbering (0 to 3 in the example of FIG. 5B).

It has to be noted that the nested block scheme is not restricted to different domains, but can also be adopted for a single domain such as the time domain. Then, for example (not shown in the drawings), an octet of sub-blocks forms a block, and an octet of blocks forms a hyper-block. However, the number of sub-blocks forming a block and blocks forming a hyper-block need not be the same (as shown in FIG. 5B). Also, the depth of nesting the block hierarchy is not limited to three, bit can still be deeper by defining other block levels (for example "mega-blocks" consisting of hyper-blocks, etc.)

Furthermore, FIG. 5C illustrates a still further modification. As mentioned herein above, the number of data units or packets (within a e.g. sub-block or block represented by a physical location) is not necessarily the same for both values of T. As is apparent from FIG. 5C, referring to an example according to which the time has been mapped to a numbering scheme, at time instant "2" a (sub-)block is indicated as a retransmitted block due to the value of the bit T (T=1). However, while each block having assigned a value of T=0 contains only one data unit (data packet or data entry X,Y, and/or Z, respectively), the retransmission block contains more than one data units and also a corresponding number of additional headers, one header for each data packet per (sub-)block.

According to the illustrated example, data packets X and Y received at time instants 0 and 1 were not received without failure. These data packets are retransmitted at time instant "2" and the retransmitted block (or sub-block if there is a nested block arrangement defined) contains data packet X headed by a header including the reference REF=0, and contains the data packet Y headed by a header including the reference REF=1. Similar as in the previous examples, the respective header includes a reference to a physical location of the initial (or earlier) transmission.

Accordingly, as described herein above, the present invention proposes a method of signaling which data blocks can be combined together in an incremental redundancy communication system consisting of a transmitter device and a receiver device, the method comprising the steps of transmitting said blocks from a transmitter device to a receiver device, with each transmitted data block including an information indicating whether a respective data block is transmitted for a first time or is a retransmitted block; checking, at said receiver device, whether the transmission of a respective data block has failed; requesting a retransmission of said data block from the transmitter device if said transmission of said respective block has failed, and in response to receiving said retransmission request at the transmitter device side, setting said information to a value indicating that said respective data block is a retransmitted block, and adding at least one header to said data block to be retransmitted, said header representing a reference to a physical location of an earlier transmission of said block in a sequence of transmitted blocks. By virtue of the proposed method and accordingly adapted transmitter and receiver devices of a corresponding communication system, transmitting of a block number within a respective data block can be dispensed with, thereby reducing an overhead of transmitted data and increasing user data throughput in the communication system.

It should be understood that the above description and accompanying figures are merely intended to illustrate the present invention by way of example only. The preferred embodiments of the present invention may thus vary within the scope of the attached claims.

What is claimed is:

1. A method of signaling which data blocks can be combined together in an incremental redundancy communication system consisting of a transmitter device and a receiver device, the method comprising the steps of:
    transmitting said blocks from a transmitter device to a receiver device, with each transmitted data block including an information indicating whether a respective data block is transmitted for a first time or is a retransmitted block;
    checking, at said receiver device, whether the transmission of a respective data block has failed;
    requesting a retransmission of said data block from the transmitter device if said transmission of said respective block has failed,
    wherein,
        in response to receiving said retransmission request at the transmitter device side,
        setting said information to a value indicating that said respective data block is a retransmitted block, and
    adding at least one header to said data block to be retransmitted, said header representing a reference to a physical location of an earlier transmission of said block in a sequence of transmitted blocks.

2. A method according to claim 1, wherein
said physical location of a respective block is represented by mapping the time of transmission of a respective block to a numbering scheme.

3. A method according to claim 2, wherein said adopted numbering scheme is agreed upon between said transmitter and said receiver of said communication system in an initial handshaking step.

4. A method according to claim 1, wherein
said physical location of a respective block is represented by mapping the frequency of transmission of a respective block to a numbering scheme.

5. A method according to claim 1, wherein
said physical location of a respective block is represented by mapping the code used for transmission of a respective block to a numbering scheme.

6. A method according to claim 1, wherein
said physical location of a respective block is represented by mapping the frequency of transmission, code used for transmission on a respective frequency and time of transmission using a respective code on a respective frequency in combination to a numbering scheme.

7. A method according to claim 1, wherein
said block is composed of a plurality of sub-blocks and the header represents a reference to a physical location of a retransmitted sub-block in a sequence of transmitted blocks.

8. A method according to claim 1, comprising the further step of
    combining the retransmitted block with other blocks using the information contained in said header.

9. A method according to claim 1, wherein
said information is represented by a flag.

10. A method according to claim 1, wherein
said information is represented by a cyclic redundancy check sum of the header.

11. A method according to claim 1, wherein at least one of said information and said header is encoded for secure transmission.

12. A communication system consisting of a transmitter device and a receiver device, wherein
    said transmitter device is adapted to transmit said blocks to said receiver device, with each transmitted data block including an information indicating whether a respective data block is transmitted for a first time or is a retransmitted block;
    said receiver device is adapted to check whether the transmission of a respective data block has failed;
    said receiver device is adapted to request a retransmission of said data block from the transmitter device if said transmission of said respective block has failed,
    wherein,
        in response to receiving said retransmission request at the transmitter device side,
        said transmitter device is adapted
        to set said information to a value indicating that said respective data block is a retransmitted block, and
        to add at least one header to said data block to be retransmitted, said header representing a reference to a physical location of an earlier transmission of said block in a sequence of transmitted blocks.

13. A communication system according to claim 12, wherein
    said physical location of a respective block is represented by mapping the time of transmission of a respective block to a numbering scheme.

14. A communication system according to claim 13, wherein said adopted numbering scheme is agreed upon between said transmitter and said receiver of said communication system in an initial handshaking step.

15. A communication system according to claim 12, wherein said physical location of a respective block is represented by mapping the frequency of transmission of a respective block to a numbering scheme.

16. A communication system according to claim 12, wherein said physical location of a respective block is represented by mapping the code used for transmission of a respective block to a numbering scheme.

17. A communication system according to claim 12, wherein said physical location of a respective block is represented by mapping the frequency of transmission, code used for transmission on a respective frequency and time of transmission using a respective code on a respective frequency in combination to a numbering scheme.

18. A communication system according to claim 12, wherein said block is composed of a plurality of sub-blocks and the header represents a reference to a physical location of a retransmitted sub-block in a sequence of transmitted blocks.

19. A communication system according to claim 12, wherein said receiver is adapted to combine the retransmitted block with other blocks using the information contained in said header.

20. A communication system according to claim 12, wherein said information is represented by a flag.

21. A communication system according to claim 12, wherein said information is represented by a cyclic redundancy check sum of the header.

22. A communication system according to claim 12, wherein at least one of said information and said header is encoded for secure transmission.

* * * * *